June 9, 1925.  1,541,098
F. M. BALDWIN
ARM VEHICLE SIGNAL
Filed Dec. 11, 1923    4 Sheets-Sheet 1
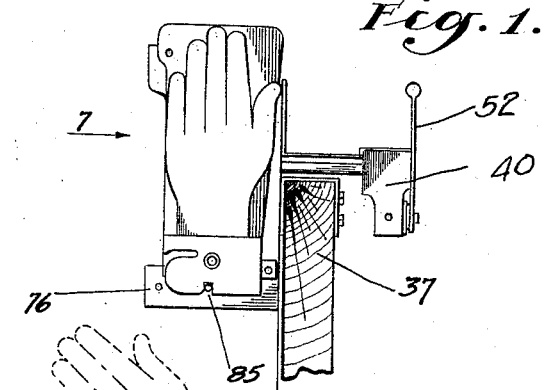
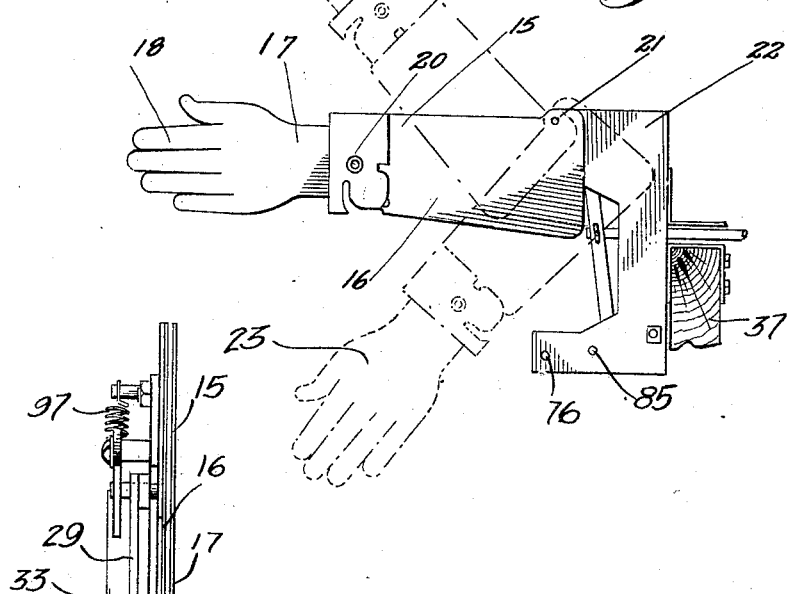
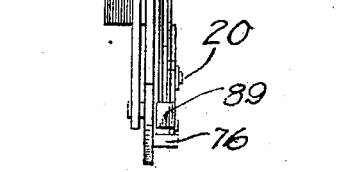
INVENTOR:
FREDERICK M BALDWIN
By
Graham + Lewis
ATTORNEYS:

June 9, 1925.
F. M. BALDWIN
ARM VEHICLE SIGNAL
Filed Dec. 11, 1923
1,541,098
4 Sheets-Sheet 2
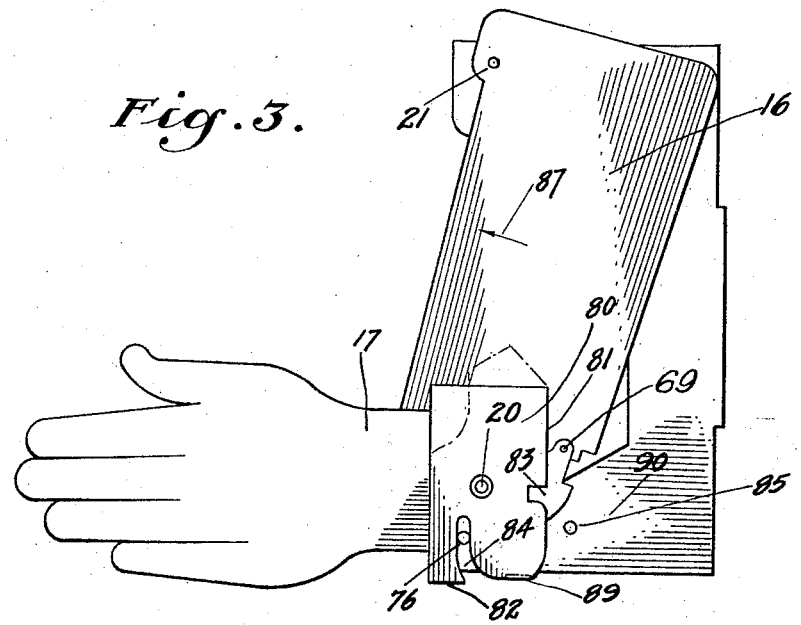
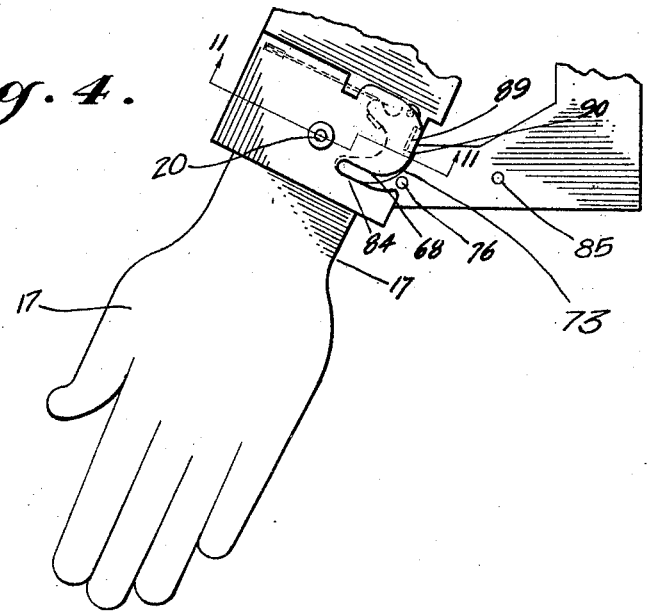
INVENTOR:
FREDERICK M. BALDWIN
BY
ATTORNEYS:

June 9, 1925.  1,541,098
F. M. BALDWIN
ARM VEHICLE SIGNAL
Filed Dec. 11, 1923  4 Sheets-Sheet 3

INVENTOR:
FREDERICK M. BALDWIN
BY
Graham + Lawie
ATTORNEYS:

June 9, 1925.  
F. M. BALDWIN  
ARM VEHICLE SIGNAL  
Filed Dec. 11, 1923  
1,541,098  
4 Sheets-Sheet 4

INVENTOR:  
FREDERICK M. BALDWIN  
BY:  
Graham + Lamie  
ATTORNEYS:

Patented June 9, 1925.

1,541,098

UNITED STATES PATENT OFFICE.

FREDERICK M. BALDWIN, OF LOS ANGELES, CALIFORNIA.

ARM VEHICLE SIGNAL.

Application filed December 11, 1923. Serial No. 679,934.

*To all whom it may concern:*

Be it known that I, FREDERICK M. BALDWIN, a citizen of the United States, residing at Los Angeles, in the county of Los Angeles, State of California, have invented a new and useful Arm Vehicle Signal, of which the following is a specification.

This invention relates to traffic signals of the character employed on vehicles to denote an intended change of movement of the car equipped therewith.

In most States, signals are imparted by the extended hand and arm, three positions thereof being employed to denote three intended changes in movement. The customary arm signal code is that by extending the arm outwardly in a horizontal position, a turn in the direction in which the arm is extended is indicated; a diagonally upward extension of the arm indicates an intended turn in the opposite direction; and a downward diagonal extension of the arm indicates an intended slowing down or stop.

It is an object of the invention to provide a signalling device simulating the extension of a human arm, this device employing a mechanical arm arranged to be swung into the customary signalling position.

It is a further object of the invention to provide a signal arm composed of plates hinged together in such a manner that they will fold into a comparatively small space when retracted.

It is a further object of the invention to provide a simple means for unfolding and folding the extensible arm and for locking the arm in extended position so that displacement thereof due to jars or jolts of the car cannot occur.

An important object of the invention is to provide a signalling device which, by virtue of its extreme simplicity and corresponding low cost due to the fact that the parts thereof may be stamped and cheaply machined in quantity lots, may be distributed at a cost well within reach of the autoist.

The especial advantages and further objects of the invention will be made evident hereinafter.

Referring to the drawings which are for illustrative purposes only,

Fig. 1 is a view showing the signal mounted upon the side wall of an automobile.

Fig. 2 is a view similar to Fig. 1 showing the signal arm in extended position.

Fig. 3 is a fragmentary view illustrating one position of the unfoldment action of the arm.

Fig. 4 is a fragmentary view showing the arm in another position.

Fig. 7 is a view taken as indicated by the arrow 7 in Fig. 1.

Figure 5:
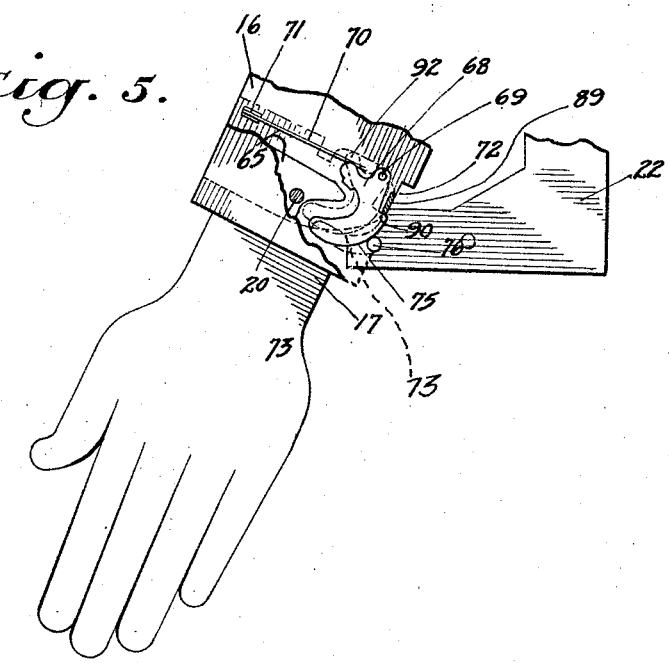
Fig. 5 is a detail of the latch mechanism for holding the hand straight with the arm while it is extended.

In the embodiment of my invention shown in the drawings, the signal member takes the form of an arm 15 consisting of a primary or counterfeit forearm plate member 16 and a lower plate member 17, the end of which represents a hand 18.

Figure 9:
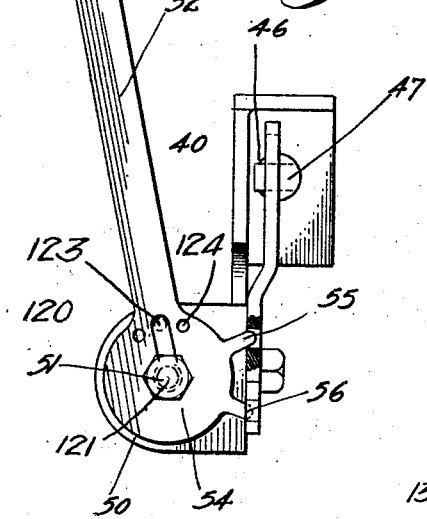
Fig. 9 is a side elevation taken as indicated by the arrow 9 in Fig. 8.
Figure 8:
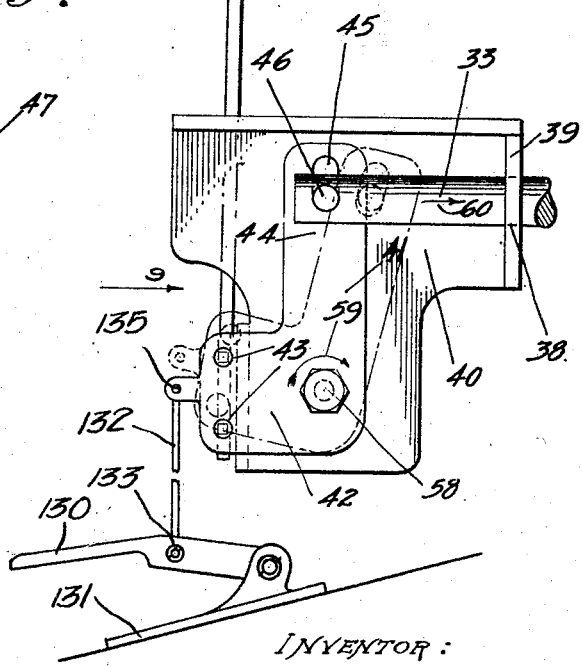
Fig. 8 is a rear view of a preferred form of operating mechanism.

The members 16 and 17 are hinged together on a rivet 20 and the right arm depends from a pivot member 21 which extends through the upper outer corner of the member 15 and is secured to the upper left hand corner of a mounting plate 22. Mechanism is provided as shown in Figs. 6, 7, 8 and 9 and swinging the arm 15 from the retracted position shown in Fig. 1 through the downwardly diagonal position indicated by the dotted lines 23, Fig. 2 and the horizontally extended position which is shown in full lines to the diagonally upward extending position indicated by the dotted lines 24 in Fig. 2. On the rear of the plate 16, is mounted a pivot 26 to which is secured a bar 27 which hinges at 28 to the upper end of an upright lever 29. The lever 29 is pivotally secured at 30 to the mounting plate 22 and is adapted to be swung from the inward position indicated at 31 in full lines to the outward position indicated at 32 in dotted lines, Fig. 6, by a longitudinal bar 33 having a pin 34 at the end thereof which extends through a slot 35 in the lever 29. The longitudinally slidable bar 33, shown as extending in a plane substantially parallel with the members 16 and 17, extends inwardly relative to the wall 37, Fig. 1 of the automobile, through an opening 38 in a flange 39 formed on a plate 40, Fig. 8. On the plate 40 is mounted a lever member 41 having an upwardly extending arm 44 and a short laterally extending arm 42 in which holes 43 are formed. The upwardly extending arm 44 of the lever member 41 is equipped with a vertically extending slot 45 which receives a pin 46 which pin 46 threads into the bar 33 in a manner to hold the arm 44 against a flattened end 47 of the bar 33 as shown in Fig. 9. Upon a forwardly bent flange or tongue 50, there is mounted by means of a bolt 51, the operating lever 52 which is stamped from flat metal and has a knob 53 situated at the upper end thereof. The lower end of the lever 52 takes the form of a disc 54 having teeth 55 and 56 extending outwardly therefrom. These teeth 55 and 56 engage the openings 43 in the lever arm 42, thus serving to gear the lever 52 to the lever 41. When the lever 52 is swung outwardly in the direction indicated by the arrow 57, Fig. 9, the teeth 55 and 56 rotate upwardly, thus causing the member 41 to rotate on the bolt 58 in the direction of the arrow 59, Fig. 8; with the result that the bar 33, moved outwardly in the direction of the arrow 60, Fig. 8, this movement of the arm 33 is transferred to the lever 29, Fig. 6; with the result that the pin 26 on the back of the plate 16 swings from the full line position in which it is shown through the various intermediate positions to the position indicated by the dotted lines 62, Fig. 6 with the result that the arm member 15 is swung outwardly through the various positions shown in Fig. 2.

To assist in holding the arm in the position desired, an arrangement as shown in Fig. 9 is provided which consists of a flat spring member 120 which is placed on the bolt 51 between the nut 121 and the portion 54 of the lever 52. The outer end of the spring member 121 is indented at 123 which indenture is arranged to fall into one of the holes 124 provided in the member 52; thus holding the arm member in one of the three extended positions thereof. The device may be very conveniently returned to its contracted position by depressing the foot lever 130 which is pivoted on the bracket 131 situated at a place convenient to the operator. The foot lever 130 is associated with the actuating mechanism by the rod 132 which extends from a point 133 on the lever 130 to the lug 135 formed on the member 41.

Referring to Figs. 3, 4, 5 and 11, the arm members 16 and 17 are separated by a washer plate 65 through which the rivet 20 extends, thus providing a space 67 between the plates 16 and 17 in one end of which space a latch member 68 is pivoted on a rivet 69 and is held in outwardly extended position by a spring 70 which is secured at 71 to the plate 16. In Fig. 5, the plate 16 is shown in full lines and the plate 17 indicated in dotted lines so that the shape of the end of the plate 16 may be clearly shown. The plate 16 is relieved as indicated at 72 and is rounded off toward the end as indicated at 73. The latch member is curved as shown at 75 and projects beyond the curvature of the plate 16 so that it will engage a pin 76 which projects upwardly from the lower portion of the mounting plate 22. The pin 76 engages the latch member 68 as the end of the plate 16 swings thereacross. As shown particularly in Figs. 3 and 4, the upper portion 80 of the lower arm member 17 provides an edge 81 which is relatively perpendicular to the extension of the member 17 and an edge 82 which is parallel to the extension of the member 17. In the edge 81, a notch 83 is formed and extending inwardly from the edge 82 is a curved open cam slot 84. When the arm 15 is in retracted position as shown in Fig. 1, the notch 83 rests over a pin 85 placed adjacent to the pin 76. As the lever 52, Fig. 9 is actuated and the portion 16 of the arm structure rotated outwardly upon the pivot 21, the notch 83, Fig. 3, is prevented from moving laterally beyond the pin 85, therefore causing the arm portion 17 to rotate downwardly upon the rivet 20 with the result that the slot 84 drops over the pin 76 as shown in Fig. 3. As the arm portion 16 continues to move outwardly in the direction indicated by the arrow 87, Fig. 3, the pin 76 being stationary bears rightwardly against the edge of the slot 84 as the pivot 20 moves leftwardly, thus causing the member 17 to rotate downwardly into the position shown in Fig. 4, this position being in direct alignment with the arm portion 16. During this movement of the member 17, or in other words, the movement between the position shown in Figs. 3 and 4, the extending portion of the latch member is engaged and depressed by the pin 76 so that an inwardly bent dog 89, Figs. 3, 4 and 11 falls into place and is engaged by the shoulders 90 of the latch member, therefore making rotation on the member 17 upon the bolt 20 impossible during the time it is in extended position, thus assuring that the arm will remain straight throughout the various signalling positions. As the arm is retracted and swings downwardly against the pin 76, the latch member 68 is first to be engaged and is rotated into the position indicated by dotted lines 92, Fig. 5, as the pin 76 advances into the slot 84, Fig. 4, the result of this rotation of the latch member being the withdrawal of the shoulder 90 from engagement with the dog, thus leaving the member 17 free to rotate from the position shown in Fig. 4 and through the position shown in Fig. 3 to the fully retracted position shown in Fig. 1. This reverse rotation of the lower arm member 17 is equipped by a rolling action produced through the engagement of the pins 76 and 85 with the slot 84 and the notch 83. As the pivot 20 swings inwardly or rightwardly from the position shown in Fig. 4, the pin 76 bears against the leftward side of the slot 84 causing it to rotate in a leftward direction relative to the pivot 20, with the result that the member 17 is swung into the position shown in Fig. 3 and with the further inward advance of the member 16 is swung upwardly into a position of engagement with the pin 85 which serves to hold the member 17 in retracted position as long as the member 16 is fully retracted.

Figure 6:
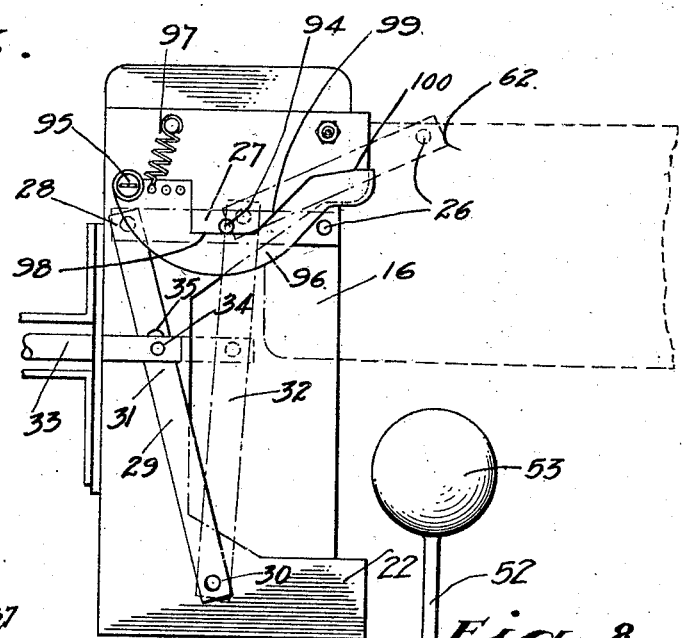
Fig. 6 is a rear view of the signal member showing certain features of motion-transmitting mechanism.

As shown in Fig. 6, the bar 27 has an outwardly projecting pin 94 disposed in the center thereof. Upon a post 95, is mounted a cam member 96 which is held forcibly upwardly by a spring member 97. When the signal arm 15 is in retracted position, the pin 94 rests against a substantially horizontal edge 98 of the cam member 96, but as the member 16 constituting the upper arm portion swings outwardly and the arm portion 17 rotates downwardly, the pin 94 engages a diagonally sloping face 99 of the cam member 96, thus increasing the upwardly acting force upon the pin which is transferred through the arm 27 to the pivot 26 and thus assists in supporting the arm 15 in extended position. When the arm 15 is fully extended in upward diagonal position, the pin 94 rests upon the top face 100 of the cam member 96.

Figure 10:
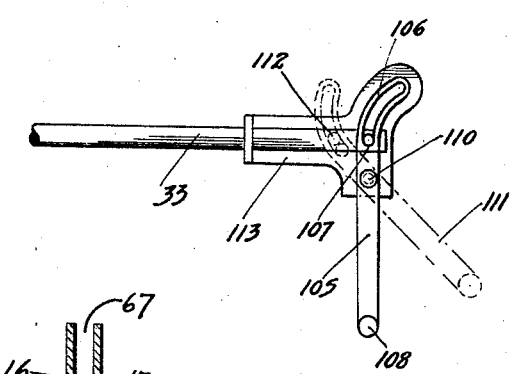
Fig. 10 is a fragmentary view showing another form of operating lever.
Figure 11:
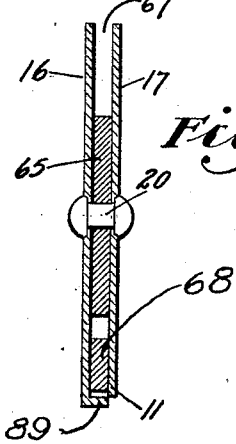
Fig. 11 is a section taken as indicated by the line 11—11 of Fig. 4.

In Fig. 10, is shown another form of signal operating member which consists of an arm member 105 having an arcuated slot 106 at the upper end thereof which slot is engaged by the pin 107 threaded into the bar 33. When by means of the handle 108, the member 105 is swung upon the pivot 110 toward the position indicated by the dotted lines 111, the pin 107 is advanced into the position shown in dotted lines 112 and rides relatively upwardly in the arcuated slot 106. A mounting plate 113 of suitable form is provided for supporting the pivot 110 and the bar 33.

As will be plainly evident from the drawings, the parts entering into the composition of the signalling device are all adapted to be stamped from sheet metal or if in the form of screws or rivets are adapted for economical screw machine production. The feature of providing an arm comprised of a number of consecutively pivoted members makes it possible to enclose the signal member in a housing of minimum size. The various features of design all incorporate toward the production of a device of this character which may be cheaply produced, quickly installed and which is extremely durable.

I claim as my invention:

1. In a traffic signal of the class described, the combination of: a supporting member; an arm member including a counterfeit forearm pivotally depending from said supporting member, and a hand pivoted to the lower and outer swinging end of said counterfeit forearm; and means comprising two levers of sheet metal geared together for swinging said arm member outwardly into signalling position.

2. In a traffic signal of the class described, the combination of: a supporting member; an arm member including a counterfeit forearm pivotally depending from said supporting member, and a hand pivoted to said counterfeit forearm and arranged to swing between a position superposed on said counterfeit forearm and a position of rectilinear extension; means comprising two levers geared together for swinging said hand from said superposed position as said forearm member swings outwardly from retracted position to signalling position; and means comprising a sliding bar engaged by one of said levers for swinging said arm member outwardly into signalling position.

3. In a traffic signal of the class described, the combination of: a supporting member; an arm member including a counterfeit forearm pivotally depending from said supporting member, and a hand pivoted to said counterfeit forearm and arranged to swing between a position superposed on said counterfeit forearm and a position of rectilinear extension; and means comprising a bar slidable in a plane parallel with said counterfeit forearm for swinging said hand from said superposed position as said forearm member swings outwardly from retracted position to signalling position.

4. In a traffic signal, the combination of: a supporting member arranged for securement to a vehicle; a signal arm member pivoted to said supporting member, said signal arm member including a counterfeit forearm pivotally depending from one end to said supporting member, a hand pivoted near the lower end of said forearm, said hand being arranged to swing between a position overlying said counterfeit forearm and a position extended in direct alignment therefrom means for locking said hand in extended position relative to said forearm; means comprising a bar slidable in a plane parallel with said forearm for swinging said forearm outwardly on its pivot; and means comprising a pin engaging a cam for rotating said hand from overlying position to extended position when said forearm is swung outwardly from retracted position.

5. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; means comprising a bar slidable in a plane parallel therewith for swinging said primary arm outwardly on its pivot; and cam and lever means for rotating said secondary arm from overlying position to extended position, when said primary arm is swung outwardly from retracted position, said means being adapted to reverse said rotation of said secondary arm when said primary arm is swung into retracted position.

6. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; means comprising a bar slidable in a plane parallel therewith for swinging said primary arm outwardly on its pivot; and cam means on said supporting member for engaging and rotating said secondary arm from overlying position to extended position, when said primary arm is swung outwardly from retracted position, said means being adapted to reverse said rotation of said secondary arm when said primary arm is swung into retracted position.

7. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; means comprising a slidable bar connected at each end with a lever for swinging said primary arm outwardly on its pivot; and cam means for rotating said secondary arm from overlying position to extended position, when said primary arm is swung outwardly from retracted position, said means being adapted to reverse said rotation of said secondary arm when said primary arm is swung into retracted position; and means for releasing said locking means just previous to the actuating of said rotating means on the inward swing thereof into retracted position.

8. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing betweeen a position overlying said primary plate and a position extended in direct alignment from said primary arm, and means for locking said secondary arm in extended position relative to said primary arm; means comprising a bar slidable by one of a pair of levers geared together for swinging said primary arm outwardly on its pivot; and cam means on said supporting member for engaging and rotating said secondary arm from overlying position to extended position, when said primary arm is swung outwardly from retracted position, said means being adapted to reverse said rotation of said secondary arm when said primary arm is swung into retracted position; and means for releasing said locking means just previous to the engagement of said rotating means on the inward swing of said primary arm into retracted position.

9. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; a sliding member extending inwardly from said supporting member in a plane parallel therewith, said actuating member having operative connection with said primary arm; lever means comprising two sheet metal elements geared together for reciprocating said actuating member; and cam means for rotating said secondary arm from overlying position to extended position, when said primary arm is swung outwardly from retracted position.

10. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; a slidable actuating member extending inwardly from said supporting member, said actuating member being parallel with and having operative connection with said primary arm; lever means comprising sheet metal elements geared together for reciprocating said actuating member; and cam means for rotating said secondary arm from overlying position to extended position, when said primary arm is swung outwardly from retracted position, said means being adapted to reverse said rotation of said secondary arm when said primary arm is swung into retracted position; and means for releasing said locking means just previous to the actuating of said rotating means on the inward swing thereof into retracted position.

11. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; an actuating member extending inwardly from said supporting member, said actuating member being parallel with and having operative connection with said primary arm; lever means comprising sheet metal elements geared together for reciprocating said actuating member; and cam means on said supporting member for engaging and rotating said secondary arm from overlying position to extended position, when said primary arm is swung outwardly from retracted position, said means being adapted to reverse said rotation of said secondary arm when said primary arm is swung into retracted position; and means for releasing said locking means just previous to the engagement of said rotating means on the inward swing of said primary arm into retracted position.

12. In a traffic signal, the combination of: a supporting member arranged to be secured to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm; means comprising a bar slidable in a plane parallel therewith for swinging said primary arm outwardly on its pivot; and cam means for rotating said secondary arm from overlying position to extended position, when said primary arm is swung outwardly from retracted position; and a member arranged to support said signal arm member in extended position.

13. In a traffic signal, the combination of: a supporting member arranged for securement to a vehicle; a signal arm member pivoted to said supporting member, said signal arm member including a primary arm pivotally depending from one end to said supporting member, a secondary arm pivoted near the lower end of said primary arm, said secondary arm being arranged to swing between a position overlying said primary plate and a position extended in direct alignment from said primary arm, and means for locking said secondary arm in extended position relative to said primary arm, an actuating member extending inwardly from said supporting member, said actuating member being a slidable bar movable by a lever and having operative connection with said primary arm; lever means comprising sheet metal elements geared together for reciprocating said actuating member; and cam means on said supporting member for engaging and rotating said secondary arm from overlying position to extended position, when said primary arm is swung outwardly from retracted position, said means being adapted to reverse said rotation of said secondary arm when said primary arm is swung into retracted position; means for releasing said locking means just previous to the engagement of said rotating means on the inward swing of said primary arm into retracted position; and a member arranged to support said signal arm member in extended position.

In testimony whereof, I have hereunto set my hand at Los Angeles, California, this 5th day of December, 1923.

FREDERICK M. BALDWIN.